(12) United States Patent
Ono

(10) Patent No.: US 7,973,952 B2
(45) Date of Patent: Jul. 5, 2011

(54) METHOD AND APPARATUS FOR DETERMINING DEVELOPER CONSUMPTION, AND IMAGE FORMING APPARATUS

(75) Inventor: Kenichi Ono, Tokyo-to (JP)

(73) Assignee: Ricoh Co., Ltd., Tokyo (JP)

( * ) Notice: Subject to any disclaimer, the term of this patent is extended or adjusted under 35 U.S.C. 154(b) by 1171 days.

(21) Appl. No.: 11/558,758

(22) Filed: Nov. 10, 2006

(65) Prior Publication Data

US 2007/0103717 A1    May 10, 2007

(30) Foreign Application Priority Data

Nov. 10, 2005  (JP) ................. 2005-326650

(51) Int. Cl.
G06K 15/00 (2006.01)
H04N 1/00 (2006.01)
H04N 1/46 (2006.01)
G03G 15/00 (2006.01)

(52) U.S. Cl. ......... 358/1.14; 358/406; 358/504; 399/24; 399/27

(58) Field of Classification Search ............. 358/1.14, 358/1.4; 399/27
See application file for complete search history.

(56) References Cited

U.S. PATENT DOCUMENTS

| | | | | |
|---|---|---|---|---|
| 5,655,174 A | * | 8/1997 | Hirst | 399/27 |
| 7,460,168 B2 | * | 12/2008 | Horiuchi | 348/362 |
| 2002/0135789 A1 | | 9/2002 | Ono | |

FOREIGN PATENT DOCUMENTS

| | | |
|---|---|---|
| JP | 58-224363 | 12/1983 |
| JP | 9-120238 | 5/1997 |
| JP | 2002-174929 | 6/2002 |
| JP | 2004-163885 | 6/2004 |
| JP | 2004-338125 | 12/2004 |

OTHER PUBLICATIONS

U.S. Appl. No. 10/757,390, filed Jan. 15, 2004, Ono.
Japanese Office Action issued Jan. 11, 2011, in Patent Application No. 2005-326650.

* cited by examiner

Primary Examiner — Benny Q Tieu
Assistant Examiner — Sunil Chacko
(74) Attorney, Agent, or Firm — Oblon, Spivak, McClelland, Maier & Neustadt, L.L.P.

(57) ABSTRACT

A developer consumption determining method for determining a developer consumption of an image forming apparatus includes the steps of dividing one of writing pixels into a plurality of sub-pixels in a main scanning direction, determining a weighting coefficient for each of surrounding sub-pixels of one of the sub-pixels located within a predetermined distance from the one of the sub-pixels on the basis of positional relationships, determining respective emission coefficients for the surrounding sub-pixels on the basis of one of durations and exposures of the light beams applied to the surrounding sub-pixels, summing products of the weighting coefficients of the surrounding sub-pixels and the respective emission coefficients to obtain total exposure for the one of the sub-pixels, repeating for all of the sub-pixels the steps of determining the weighting coefficient, determining respective emission coefficients, and summing products, and summing the total exposures for all the sub-pixels to determine the developer consumption.

14 Claims, 9 Drawing Sheets

A B C D E F G

METHOD AND APPARATUS FOR DETERMINING DEVELOPER CONSUMPTION, AND IMAGE FORMING APPARATUS

CROSS REFERENCE TO RELATED APPLICATIONS

This patent specification is based on Japanese Patent Application No. JP2005-326650 filed on Nov. 10, 2005, in the Japan Patent Office, the entire contents of which are incorporated by reference herein.

BACKGROUND OF THE INVENTION

1. Field of the Invention

The present invention relates to an image forming apparatus and a method and an apparatus for determining a developer consumption in an image forming apparatus. More particularly, the present invention relates to a method and an apparatus for precisely determining a developer consumption in an image forming apparatus for forming an image by developing a latent image formed by scanning with a light beam, and an image forming apparatus which uses at least one of the method and the apparatus for precisely determining a developer consumption therein.

2. Discussion of the Background

A background image forming apparatus calculates a consumption of toner used as a developer for forming an image according to image data.

A background method for calculating a toner consumption counts pixels to which toner is caused to adhere, and calculates the toner consumption according to the number of the pixels counted.

Another background method for calculating a toner consumption classifies dots into types according to dot arrangement patterns, counts the respective types of dots, and calculates the toner consumption according to the number of the respective types of dots.

Another background method for calculating a toner consumption counts pixels to which toner is caused to adhere, edges, blank pixels located next to the pixels to which toner is caused to adhere, and isolated pixels. The toner consumption is calculated according to results of the counting.

Providing an image forming apparatus with a sensor for determining a remaining amount of a developer according to a physical status of a toner bottle or a process cartridge incurs costs.

SUMMARY OF THE INVENTION

This patent specification describes a developer consumption determining method for determining a developer consumption of an image forming apparatus which forms an image by developing a latent image formed on an image bearing member by scanning with light beams in a main scanning direction while rotating the image bearing member in a sub-scanning direction to form light beam spots on the image bearing member, which are partially overlapped in at least the main scanning direction and include writing pixels. The developer consumption determining method includes the steps of dividing one of the writing pixels into a plurality of sub-pixels in the main scanning direction; determining a weighting coefficient for each of a plurality of surrounding sub-pixels of one of the plurality of sub-pixels located within a predetermined distance from the one of the plurality of sub-pixels on the basis of respective positional relationships of the plurality of surrounding sub-pixels with the one of the plurality of sub-pixels; determining respective emission coefficients for the plurality of surrounding sub-pixels on the basis of one of a plurality of durations and exposures of the light beams applied to each of the plurality of surrounding sub-pixels; summing products of the weighting coefficients of the plurality of surrounding sub-pixels and the respective emission coefficients to obtain a total exposure for the one of the plurality of sub-pixels; repeating for all of the plurality of sub-pixels the steps of determining the weighting coefficient, determining respective emission coefficients, and summing products; and summing the total exposures for all the plurality of sub-pixels to determine the developer consumption.

This patent specification further describes a developer consumption determining method for determining a developer consumption of an image forming apparatus which forms an image by developing a latent image formed on an image bearing member by scanning with light beams in a main scanning direction while rotating the image bearing member in a sub-scanning direction to form light beam spots on the image bearing member, which are overlapped in the main scanning direction and the sub-scanning direction and include writing pixels. The developer consumption determining method includes the steps of dividing one of the writing pixels into a plurality of scanning sub-pixels in the main scanning direction and a plurality of overlapping sub-pixels in the sub-scanning direction; determining a weighting coefficient for each of a plurality of surrounding scanning sub-pixels of one of the plurality of overlapping sub-pixels, which are on a scanning line adjacent to the one of the plurality of overlapping sub-pixels, and are located within a predetermined distance from the one of the plurality of overlapping sub-pixels, on the basis of respective positional relationships of the plurality of scanning sub-pixels with the one of the plurality of overlapping sub-pixels; determining respective emission coefficients for the plurality of scanning sub-pixels on the basis of one of a plurality of durations and exposures of the light beams applied to each of the plurality of scanning sub-pixels; summing products of the weighting coefficients of the plurality of scanning sub-pixels and the respective emission coefficients to determine a total exposure for the one of the plurality of overlapping sub-pixels; repeating for all of the plurality of overlapping sub-pixels the steps of determining the weighting coefficient, determining respective emission coefficients, and summing products; summing the total exposures for all the plurality of overlapping sub-pixels to determine a developer consumption attributed to the overlapping of light beam spots in the sub-scanning direction; and determining the developer consumption of the image forming apparatus by using the developer consumption attributed to the overlapping of light beam spots in the sub-scanning direction.

This patent specification further describes a developer consumption determining method for determining a developer consumption of an image forming apparatus which forms an image by developing a latent image formed on an image bearing member by scanning with light beams in a main scanning direction while rotating the image bearing member in a sub-scanning direction to form light beam spots on the image bearing member, which are overlapped in the main scanning direction and the sub-scanning direction and include writing pixels. The developer consumption determining method includes the steps of dividing one of the writing pixels into a plurality of scanning sub-pixels in the main scanning direction and a plurality of overlapping sub-pixels in the sub-scanning direction; determining a weighting coefficient for each of a plurality of surrounding scanning sub-pixels of one of the plurality of scanning sub-pixels, which are on the same scanning line as the one of the plurality of scanning sub-pixels and are located within a predetermined distance from the one of the plurality of scanning sub-pixels, on the basis of respective positional relationships of the plurality of scanning sub-pixels with the one of the plurality of scanning sub-pixels; determining respective emission coefficients for the plurality of scanning sub-pixels on the basis of one of a plurality of durations and exposures of the light beams applied to each of the plurality of scanning sub-pixels; summing products of the weighting coefficients of the plurality of scanning sub-pixels and the respective emission coefficients to determine total exposure for the one of the plurality of scanning sub-pixels; determining a weighting coefficient for each of the plurality of surrounding scanning sub-pixels of one of the plurality of overlapping sub-pixels, which are on a scanning line adjacent to the one of the plurality of overlapping sub-pixels and are located within a predetermined distance from the one of the plurality of overlapping sub-pixels, on the basis of respective positional relationships of the plurality of scanning sub-pixels with the one of the plurality of overlapping sub-pixels; determining respective emission coefficients for the plurality of scanning sub-pixels on the basis of one of a plurality of durations and exposures of the light beams applied to each of the plurality of scanning sub-pixels; summing products of the weighting coefficients of the plurality of scanning sub-pixels and the respective emission coefficients to determine a total exposure for the one of the plurality of overlapping sub-pixels; repeating for all of the plurality of overlapping sub-pixels the steps of determining the weighting coefficient, determining relative emission coefficients, and summing products; and summing the total exposures for all the scanning sub-pixels and the overlapping sub-pixels to determine the developer consumption.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
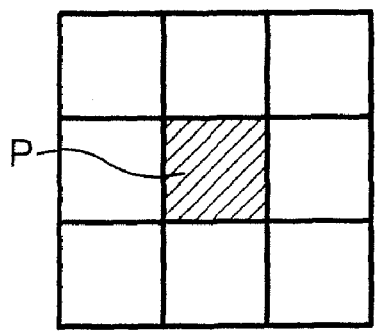
FIG. 1 is a schematic illustration of an arrangement of pixels included in an image to be formed by an image forming apparatus.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, a developer consumption determining method according to an exemplary embodiment of the present invention is described.

The developer consumption determining method of the present invention is used to obtain the consumption of a developer in an image forming apparatus such as a printer, a copier, a facsimile machine, and a digital multifunction printer which forms an image by developing with a developer such as toner a latent image formed by scanning with a light beam such as laser.

In the image forming apparatus, raster scanning with a light beam is performed to form a latent image on a latent image bearing member. Scanning is performed in a main scanning direction, and is repeated in a sub-scanning direction until an entire page is scanned. A developer is caused to adhere to the latent image so that a visible image is formed. The image bearing member is, for example, a photoconductor having a shape such as a drum and a belt. The latent image is formed on a surface of the image bearing member according to the duration and intensity of irradiation with a light beam. A larger amount of developer adheres to a position in which the duration and the intensity of irradiation with a light beam is longer and higher. Accordingly, when the number of the positions included in an area is larger, a larger amount of developer is consumed in the area.

At the same time, it is known that an intensity distribution of a light beam is approximated by normal distribution of an ellipse, for which a diameter of a static beam is defined as a diameter of an area having an intensity of not less than $1/e^2$ (i.e. 13.4%) of a peak intensity. An image forming apparatus generally used in recent years uses a light beam having a diameter of several tens of microns in the main scanning direction, and a diameter in a range of several tens of microns to approximately a hundred microns in the sub-scanning direction.

When raster scanning with the light beam is performed on a latent image bearing member, a latent image is formed by moving a beam having an ellipse shape in the main scanning direction at a high speed while being turned on and off according to on and off information on each pixel of an image to be written. When a center of a turned-on light beam moves, the light beam gives exposure energy to a region adjacent to the center in an amount according to a distance from the center. It is conceived that a latent image to be formed by the raster scanning can be calculated by a convolution of the intensity of the light beam.

Latent image forming of an image forming apparatus performed by scanning with a light beam is described below in detail referring to one example of 600 dpi binary writing (hereinafter 600 dpi).

In this example of 600 dpi, although a pixel (dot) pitch in an image to be written is approximately 42 μm, a general laser printer uses a light beam for writing which has a diameter of 60 μm in the main scanning direction, and a diameter of 80 μm in the sub-scanning direction.

Figure 2:
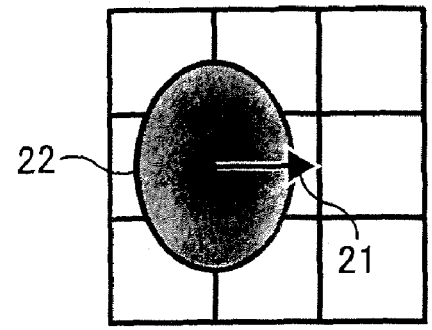
FIG. 2 is a schematic illustration of a scanning range of a light beam incident on the pixels when writing is performed.

FIG. 1 schematically illustrates an arrangement of pixels included in an image to be formed by an image forming apparatus. FIG. 2 schematically illustrates a scanning range 22 of a light beam incident on the pixels. When writing is performed on a pixel P located in the middle of the pixels (highlighted by hatching in FIG. 1) light is emitted during a period of scanning in which a center of the light beam moves from a left end to a right end of the pixel P as shown by an arrow 21 in FIG. 2.

Figure 3:
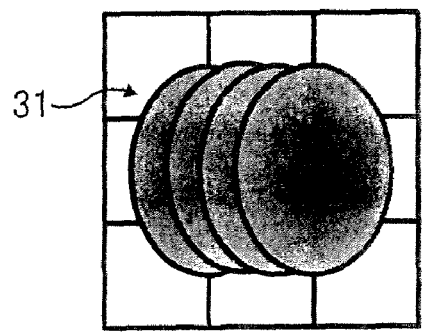
FIG. 3 is a schematic illustration of time-series changes of a spot of a light beam moving in the scanning range shown in FIG. 2.
Figure 4:
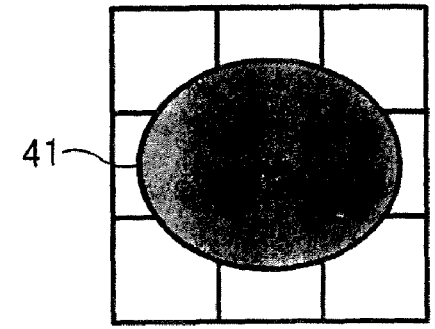
FIG. 4 is a schematic illustration of a latent image formed by scanning shown in FIG. 3.

FIG. 3 schematically illustrates time-series changes of a spot 31 of the light beam. FIG. 4 schematically illustrates a latent image 41 formed by scanning shown in FIG. 3. The spot 31 moves on a latent image bearing member as shown in FIG. 3, and finally, the latent image 41 is formed according to distribution of exposure energy which is derived by a convolution of distribution of light beam intensity for a duration of emission.

As understood from FIGS. 2 to 4, as the light beam expands, a spot which is a range irradiated with the light beam extends off the pixel P on which writing is to be performed and pixels before and after the pixel P in the main scanning direction (at the left and the right in the FIGS. 2 to 4) are also irradiated with the light beam when scanning is performed with the center of the spot 31 moving from the left end to the right end of the pixel P. In the example, as the spot 31 of the light beam has a diameter of 60 μm in the main scanning direction, which is larger than the width of the pixel P in the main scanning direction, even when writing is performed only at the center of the pixel P and the vicinity thereof, the spot 31 extends off the pixel P.

Further, as the spot 31 of the light beam has a diameter of 80 am in the sub-scanning direction, which is also larger than the width of the pixel P in the sub-scanning direction, the spot 31 extends off the pixel P in the sub-scanning direction.

Therefore, when writing is performed on one pixel, the writing influences the eight pixels closely surrounding the pixel.

Figure 5:
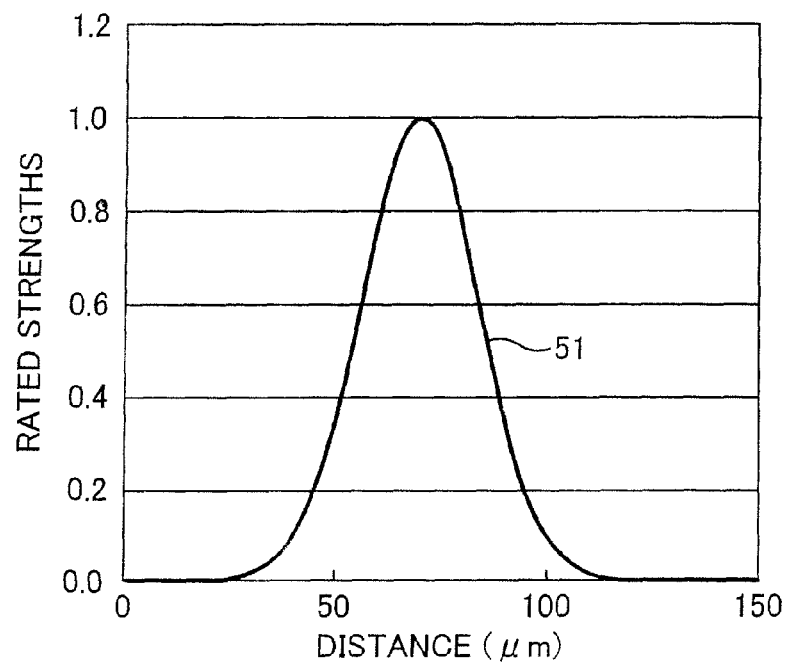
FIG. 5 is a graph of exemplary intensity distribution of a static light beam.

FIG. 5 is a graph of an example intensity distribution of a static light beam. A solid line 51 represents intensity distribution (i.e. profile) of a light beam having a diameter of 55 μm in the main scanning direction. A horizontal axis in FIG. 5 represents a distance from a reference point in the main scanning direction. A vertical axis in FIG. 5 represents rated strengths.

Figure 6:
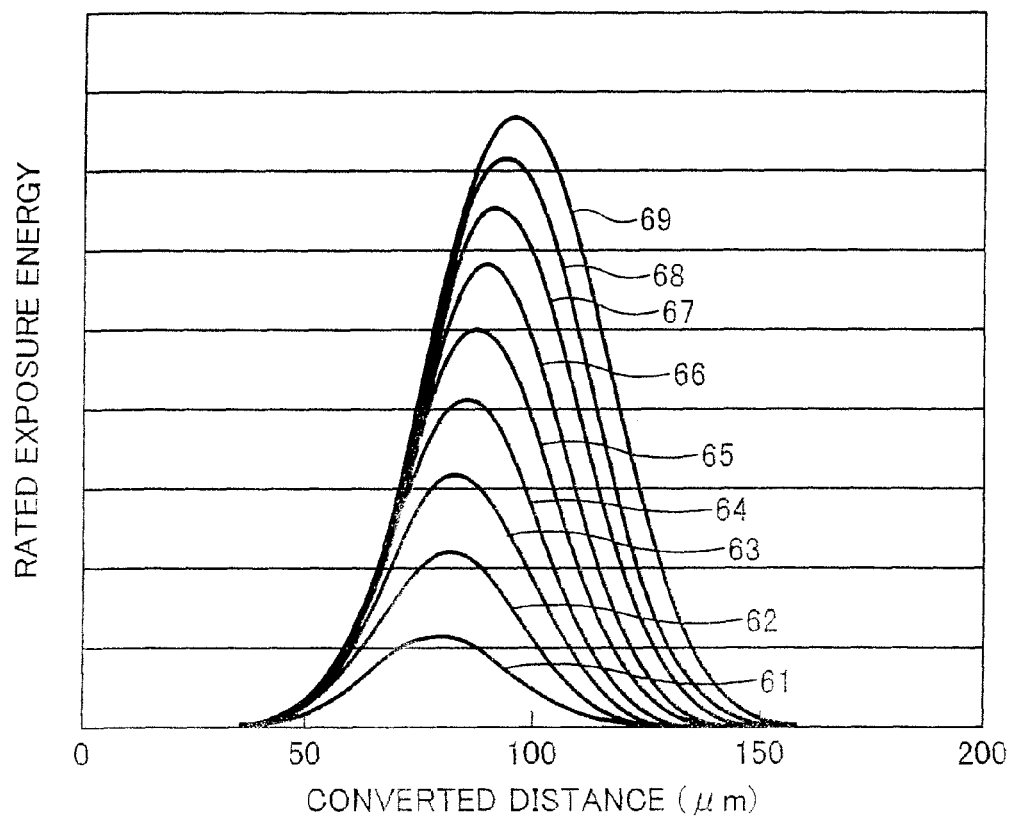
FIG. 6 is a graph of exposure energy distribution obtained through scanning simulation in which the light beam shown in FIG. 5 is emitted in predetermined durations.

FIG. 6 shows exposure energy distribution obtained through scanning simulation in which the light beam shown in FIG. 5 is emitted in predetermined durations.

A horizontal axis in FIG. 6 represents a distance from a reference point in the main scanning direction. A vertical axis in FIG. 6 represents rated exposure energy.

In the simulation, light is emitted a plurality of times in different durations. The durations are set in 3 nano-second increments from 3 nano-seconds to 27 nano-seconds. Solid lines 61 to 69 represent quantities of light when the durations of emission are 3, 6, 9, 12, 15, 18, 21, 24, and 27 nano-seconds, respectively.

Emitting the light in the duration of 27 nano-seconds corresponds to full emission for writing one pixel in this example of 600 dpi. Samples of the short durations correspond to controlled writing in which a duty ratio is controlled by a pulse width modulation (PWM).

A result of the above simulation can be obtained by performing convolutions while gradually moving a spot of the light beam as shown in FIG. 5.

A latent image having an electric potential according to exposure energy as shown in FIG. 6 is formed on a latent image bearing member. In a development process, an amount of developer according to the electric potential adheres to the latent image bearing member when the amount of developer is consumed. In other words, a developer consumption in image forming is determined according to exposure energy at every point (or in every region) of the latent image bearing member.

Figure 7:
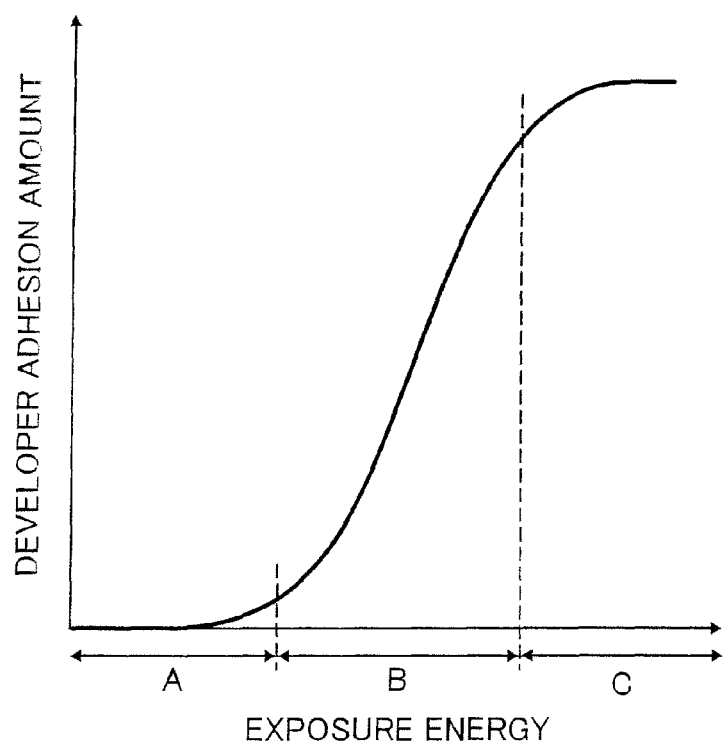
FIG. 7 is a graph showing a relationship between exposure energy and the amount of developer which adheres to a latent image bearing member.

FIG. 7 shows a relationship between exposure energy and the amount of developer adhering to a latent image bearing member (i.e. a developer consumption). A horizontal axis in FIG. 7 represents the exposure energy. A vertical axis in FIG. 7 represents the amount of adhering developer.

As shown in FIG. 7, in a range A in which exposure energy is low, a developer is scarcely consumed as the developer does not adhere to the latent image bearing member. In a range B in which exposure energy exceeds a predetermined threshold, an increasing amount of developer is consumed according to an increase in the exposure energy. In a range C in which exposure energy exceeds a predetermined upper limit, the amount of developer which adheres to the latent image bearing member does not increase any more, and the consumption of developer hits a peak.

In the transition of the exposure energy from the range A to the range B, a ratio of an increase in a developer consumption to an increase in exposure energy gradually grows. When the exposure energy exceeds the predetermined threshold, the exposure energy enters the range B. When exposure energy is within the range B, the relationship between the developer consumption and the exposure energy is substantially linear. The relationship between the developer consumption and the exposure energy, a threshold value, and an upper limit value can be obtained by an experiment.

Therefore, a developer consumption in image forming can be calculated by obtaining a distribution of exposure energy of a light beam incident on the latent image bearing member. In other words, developer consumption in image forming can be calculated by obtaining a distribution of a latent image formed by scanning with the light beam on a latent image bearing member, and converting the latent image distribution to the developer consumption according to the relationship shown in FIG. 7. Further, since the latent image distribution is formed by overlapping light beams incident at each position for scanning, the latent image distribution can be derived by performing convolutions of the overlapping light beams. Alternatively, the convolutions may be performed by inputting signals representing scanning positions, on and off information, and light quantities of a light beam into an analogue integrating circuit.

However, in order to calculate a developer consumption in an image forming apparatus, it is preferable that the developer consumption be easily calculated in real time.

The developer consumption determining method according to one embodiment of the present invention is described below in detail referring to FIG. 8 to 14.

The calculation of a developer consumption focusing on overlapping of light beams in the main scanning direction is described below.

As described above, the exposure energy distribution of a light beam is the normal distribution (i.e. Gaussian distribution). A beam profile similar to the profile shown in FIG. 5 is created by using a static beam having a diameter of 60 μm in the main scanning direction.

Figure 8:
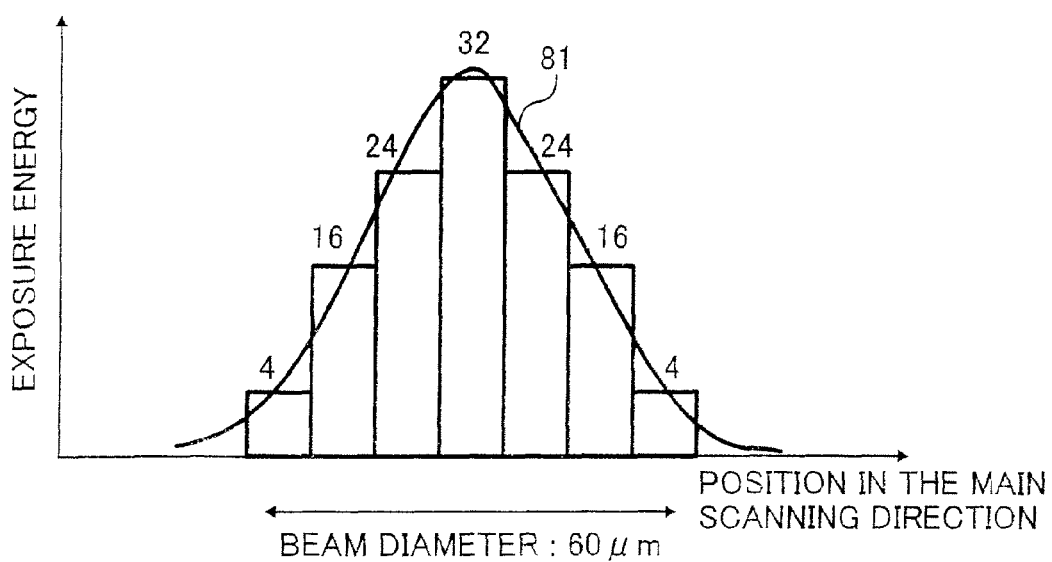
FIG. 8 is a graph representing exemplary approximation of a beam profile of a static beam.

FIG. 8 shows an example approximation of the beam profile of the static beam having the diameter of 60 μm in the main scanning direction. A horizontal axis in FIG. 8 represents positions in the main scanning direction. A vertical axis in FIG. 8 represents exposure energy. A solid line 81 represents the beam profile.

In detail, an area irradiated with the light beam is divided into seven sub-areas in the main scanning direction centering on the center of the light beam, each having a width of 10 μm. Exposure energy in each of the sub-areas is derived, and the beam profile can be approximated by using seven discrete exposure energy values. Values, 4, 16, 24, 32, 24, 16, and 4, indicated in the vicinity of respective bars in FIG. 8, are relative values of the exposure energy in the respective sub-areas corresponding to the respective bars.

Since the exposure energy distribution is symmetric both in the main scanning direction and the sub-scanning direction when the center of the central sub-area is set to be the center of the light beam, exposure energy values in the respective sub-areas become symmetric as shown in FIG. 8.

Further, when a light beam has a diameter of 60 μm, the exposure energy of the light beam is $1/e^2$ in a position approximately 30 μm away from the center of the light beam (approximately 14 percent of the exposure energy at the center), it is determined that the exposure energy in positions at distances of longer than 30 μm from the center of the light beam is ignored. Because the developer does not adhere to a latent image bearing member while the exposure energy is within a predetermined threshold, the exposure energy within the predetermined threshold can be ignored without causing a significant impact. The width of a sub-area for approximation of the beam profile is not limited to 10 μm. The widths of the sub-areas in total need to be the same as the diameter of the light beam, i.e. approximately 60 μm.

When scanning with a light beam is performed on a latent image bearing member, the light beam continuously travels in the main scanning direction to form a latent image as described above. In the explanation below, the distribution of a latent image to be formed is approximately calculated by using the approximated values of the beam profile shown in FIG. 8 to simplify the calculation.

Figure 9:
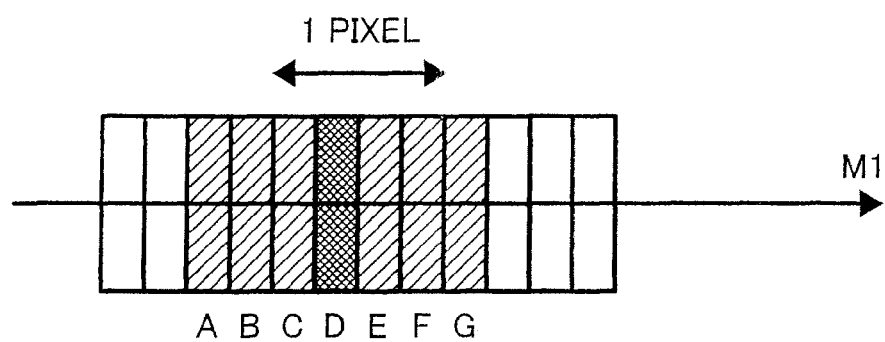
FIG. 9 is a schematic illustration of sub-pixels generated by dividing a pixel.

FIG. 9 illustrates sub-pixels generated by dividing a pixel. An arrow M1 indicates the main scanning direction. As shown in FIG. 9, one pixel in one embodiment of a 600 dpi image forming apparatus (having a width of 1/600 inch) is divided into four sub-pixels, each having a width of 10 μm that is substantially the same as the width of the sub-area. The sub-pixels are arranged such that a light beam traveling in the main scanning direction discretely moves on each of the sub-pixels. It is assumed that when a light beam is incident at a position, respective sub-pixels located within a predetermined distance from the center of the position (in this embodiment, the predetermined distance refers to three sub-pixels, i.e., preceding three and succeeding three sub-pixels in the main scanning direction are included) are provided with the exposure energy in the respective sub-areas shown in FIG. 8 according to the respective distances from the center.

For example, when a light beam is incident on a sub-pixel D in FIG. 9, exposure energy is assumed to be provided to sub-pixels A, B, C, D, E, F, and G in energy units of 4, 16, 24, 32, 24, 16, and 4, respectively.

Superimposed light beams incident on the respective sub-pixels are assumed to be total light beams incident through entire scanning. Therefore, by adding respective amounts of exposure energy provided on a sub-pixel when light beams are incident on respective sub-pixels, the amount of exposure energy provided on the sub-pixel through scanning can be obtained.

Actual calculation can be easily performed by featuring sub-pixels one after another to calculate the amount of exposure energy provided on the respective sub-pixels. This is because when one sub-pixel is featured, positions of incident light beams which provide the sub-pixel with exposure energy are determined as the sub-pixel is provided with exposure energy only when the sub-pixel is located within the predetermined distance from a position at which a light beam is incident.

For example, it is only when light beams are incident on the sub-pixels A to G that the amount of exposure energy on the sub-pixel D shown in FIG. 9 is influenced. Further, when a light beam is incident on the sub-pixel A, the sub-pixel D is provided with exposure energy in the energy unit of 4 as the sub-pixel is located in the right third sub-area from the center (i.e. the sub-pixel A). When the light beam is turned off in a position of the sub-pixel A, the exposure energy is not provided to the sub-pixel D. Accordingly, when light beams are incident on the sub-pixels B, C, and D, the sub-pixel D is provided with exposure energy in the energy units of 16, 24, and 32, respectively.

When characters dA, dB, dC, dD, dE, dF, and dG represent respective data of whether light beams are turned on or off in the positions of the sub-pixels A to G, exposure energy EnD to be provided to the sub-pixel D through scanning can be derived as follows:

$$EnD = dA*4 + dB*16 + dC*24 + dD*32 + dE*24 + dF*16 + dG*4 \qquad \text{<Formula 1>}$$

Data of whether a light beam is turned on or off in the position of a sub-pixel can be derived from image data which determines contents to be written on a pixel to be divided into sub-pixels including the sub-pixel. For example, it can be determined such that "1" represents 100% emission of light, and "0" represents no emission of light. In one embodiment shown in FIG. 9, in order to obtain on-off data for the above purpose, image data of a pixel including a sub-pixel to be featured and preceding and succeeding pixels of the pixel is needed.

Further, since exposure energy is proportional to the duration of light emission and the amount of emitted light, when an intermediate value according thereto is used, exposure energy can be calculated even in the case of multi-value writing.

Figure 10:
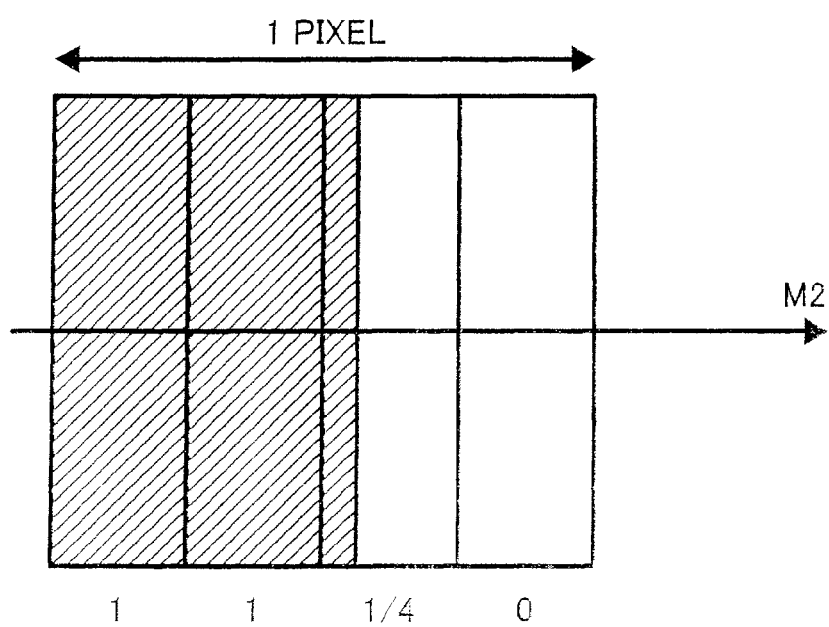
FIG. 10 is an illustration for explaining how to determine an emission coefficient to be used in writing of multi-value data.

FIG. 10 illustrates a pixel on which a sexadecimal pulse width modulation is performed. An arrow M2 indicates the main scanning direction. In the sexadecimal pulse width modulation shown in FIG. 10, multi-value data of 9/16 is written from a left end of the pixel, which is the part shaded with hatching.

In FIG. 10, the pixel includes four sub-pixels including first, second, third, and fourth pixels from the left end. On-off data for the first and second sub-pixels includes a value of "1" since a light beam is continuously emitted during scanning periods thereof. On-off data for the third sub-pixel includes a value of "¼" since the light beam is emitted only a quarter of a scanning period thereof. On-off data for the fourth sub-pixel includes a value of "0" since the light beam is not emitted during a scanning period thereof. In another embodiment in which the output of a light beam is changed according to multi-value data, on-off data needs to include a value according to the output of the light beam.

In other words, on-off data can be considered as an emission coefficient proportional to the duration of light emission or the amount of emitted light. It is not needed, however, that an emission coefficient has a value in a range from 0 to 1.

Further, the factor by which on-off data is multiplied is, as described in the above description referring to FIG. 8, derived by approximating a beam profile. It is preferable that the factor can be set upon a calculation. This is because, in the detection of a developer consumption in an actual image forming apparatus, an output of a light beam may be changed when an output adjustment is made. Further, precision of a parameter to be used for the detection may be improved when a result of the detection can be utilized as feedback. In this embodiment, when exposure energy is divided into the symmetrical sub-areas, coefficients for sub-areas located at symmetrical positions in terms of the center of a light beam may be always dealt as having a common value so that a register to be used for setting can be shared, resulting in simplified calculation.

Further, exposure energy to be used in the calculation may have relative values. In this embodiment, a coefficient for a sub-area (preferably, the sub-area at the center) can be provided with a fixed value. Then, coefficients for sub-areas other than the sub-area can be determined according to the fixed value. Further, when the adjustment of an output of a light beam is made, a coefficient may be automatically generated and set by multiplying a coefficient before the adjustment by a factor of a rate of change in the output due to the adjustment.

The above coefficient used as the factor for multiplication can be considered as a weighting factor for determining the amount of exposure energy to be provided on a featured sub-pixel according to a positional relationship between the featured sub-pixel and a sub-pixel at which the center of a light beam is located.

In consideration of the above points, exposure energy En to be provided on a featured sub-pixel can be derived, for example, as follows:

$$En = P(n-3)*m3 + P(n-2)*m2 + P(n-1)*m1 + P(n)*32 + P(n+1)*m1 + P(n+2)*m2 + P(n+3)*m3 \quad \text{<Formula 2>}$$

wherein the featured sub-pixel is the "n"th sub-pixel, $P(n)$ represents an emission coefficient for the "n"th pixel, and m1, m2, and m3 represent weighting coefficients determined by a register. Further, as described above, the value of 32, a weighting coefficient by which $P(n)$ is multiplied, may be substituted by any other value.

Respective developer consumptions on sub-pixels can be derived by converting respective amounts of exposure energy on the sub-pixels calculated according to the above formula 2 by using the relationship shown in FIG. 7.

In one embodiment, as described above referring to FIG. 7, a developer is scarcely consumed as long as exposure energy does not exceed a predetermined threshold. Therefore, in the calculation of developer consumption, the predetermined threshold (hereinafter, referred to as a development threshold) is subtracted from exposure energy, and only values exceeding the development threshold need to be considered. Further, when exposure energy exceeds a predetermined upper limit value, developer consumption does not increase any further. In this embodiment, therefore, the upper limit value is adopted as a value of exposure energy, and only values exceeding the development threshold need to be considered. A development threshold and an upper limit value may vary depending on a configuration of a development process, a developer or a latent image bearing member to be used, an output of a light beam, and so forth. Therefore, it is preferable that any value previously selected according to an experiment, or determined by using a result of detection as feedback can be set.

Further, when a value of exposure energy is larger than a development threshold and smaller than an upper limit value, the relationship between the exposure energy and the developer consumption is substantially linear. Therefore, the value of exposure energy (exceeding the development threshold) can be used as a converted value of the amount of developer consumption. When a developer consumption needs to be expressed in concrete units of gram, milliliter, or mol, a constant for conversion to the units needs to be previously derived by an experiment so that a converted value is multiplied by the constant. When the status of use of a developer in a developer package such as a toner bottle or a process cartridge needs to be known, a value corresponding to an initial content needs to be previously derived by an experiment so that a remaining amount can be calculated by subtracting a developer consumption from the value corresponding to the initial amount.

When a developer consumption on one pixel needs to be known, for example, in one embodiment shown in FIG. 9, respective developer consumptions on the sub-pixels C, D, E, and F need to be derived and summed up.

When respective developer consumptions on all sub-pixels to be printed in one page are derived and summed up, a total developer consumption on the page can be obtained. Further, when respective developer consumptions on all pages on which image forming is performed after the commencement of use of a developer package such as a toner bottle and a process cartridge are derived and summed up, a total developer consumption of the developer package can be obtained. In this embodiment, it is possible to inform a user of the fact that the total developer consumption approaches an initial content so that the user can prepare for replenishment of the developer, or request a service base to deliver a developer package for replacement.

An example of the above detection of a developer consumption is described below.

Figure 11:
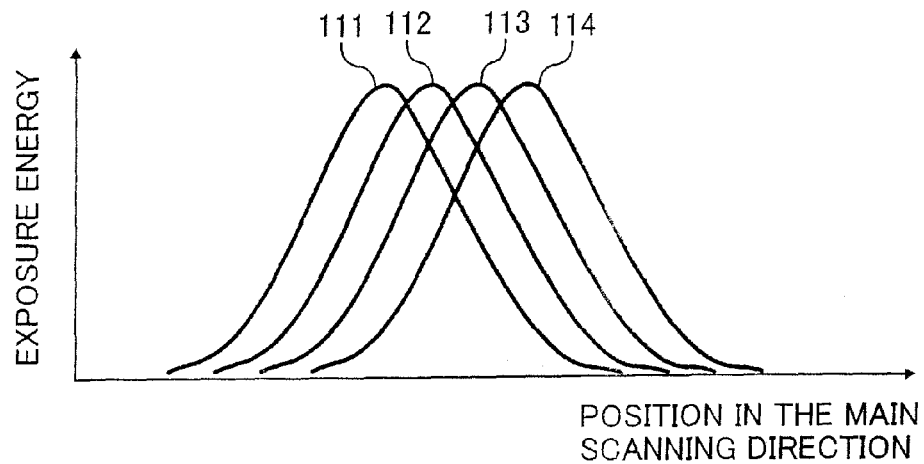
FIG. 11 is a schematic illustration of distribution of exposure energy provided to a latent image bearing member when light beams with a duty rate of 100% are incident on four sub-pixels included in an independent pixel.

FIG. 11 illustrates exposure energy represented by beam profiles 111, 112, 113, and 114 of light beams incident on four sub-pixels located in respective positions. A horizontal axis represents positions in the main scanning direction. A vertical axis represents exposure energy.

In the case of an independent pixel (having four sub-pixels) on which a light beam is incident with a duty rate of 100%, when the approximation described above referring to FIGS. 8 and 9 is performed, exposure energy derived by superimposing the beam profiles 111, 112, 113, and 114 are obtained by summing up exposure energy corresponding to respective light beams incident at the respective positions.

Figure 12:
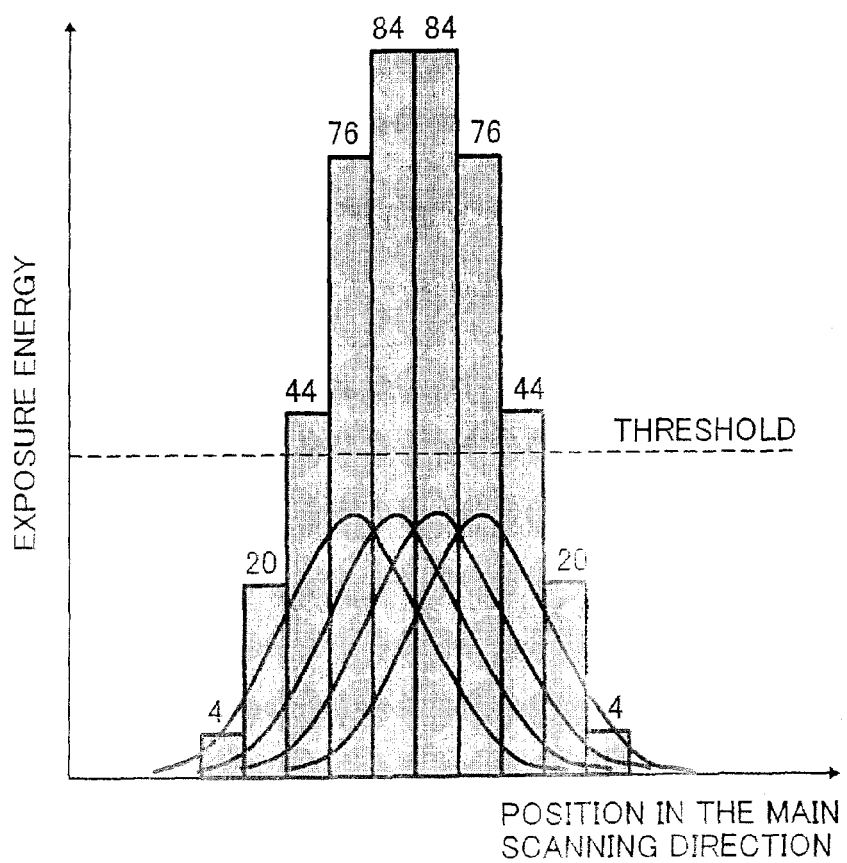
FIG. 12 is a bar graph of the distribution of exposure energy shown in FIG. 11.

FIG. 12 shows values of exposure energy of respective shaded bars. A horizontal axis represents the positions in the main scanning direction as shown in FIG. 11. A vertical axis represents the exposure energy as shown in FIG. 11.

The exposure energy on the respective sub-pixels, when approximated as described above referring to FIG. 8, can be calculated by using formula 2. The values derived by the calculation are shown in FIG. 12 in the vicinity of the respective bars.

Figure 13:
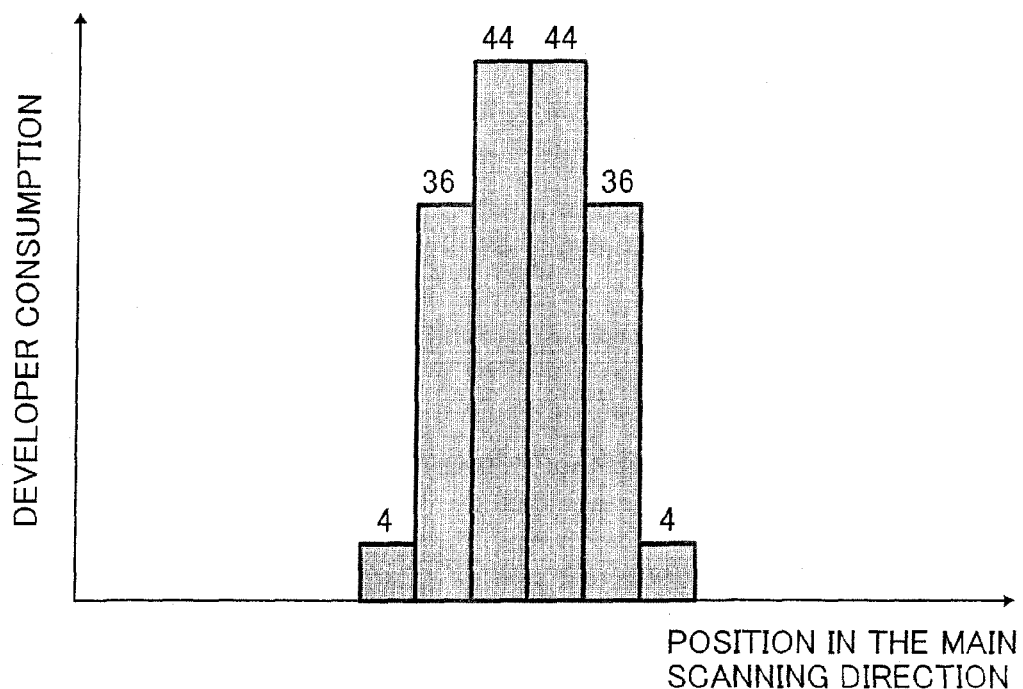
FIG. 13 is a bar graph of developer consumptions converted from the distribution of exposure energy shown in FIG. 12.

In one embodiment in which the development threshold has a value of 40, the development threshold is subtracted from the derived exposure energy in the respective sub-pixels so that converted values as shown in FIG. 13 are obtained. When a result of the subtraction is a negative value, the result is dealt set to 0.

FIG. 13 shows converted values of respective developer consumptions on the respective sub-pixels. A horizontal axis represents the positions in the main scanning direction. A vertical axis represents developer consumptions.

Even in one embodiment in which a light beam is partially incident on a sub-pixel as shown in FIG. 10, exposure energy derived by superimposing light beams incident at respective positions of sub-pixels is obtained by summing up exposure energy corresponding to respective light beams incident at the respective positions as in one embodiment shown in FIG. 11. A difference between the two embodiments is that when on-off data has an intermediate value as in one embodiment shown in FIG. 10, beam profiles to be summed up are as shown in FIG. 14.

Figure 14:
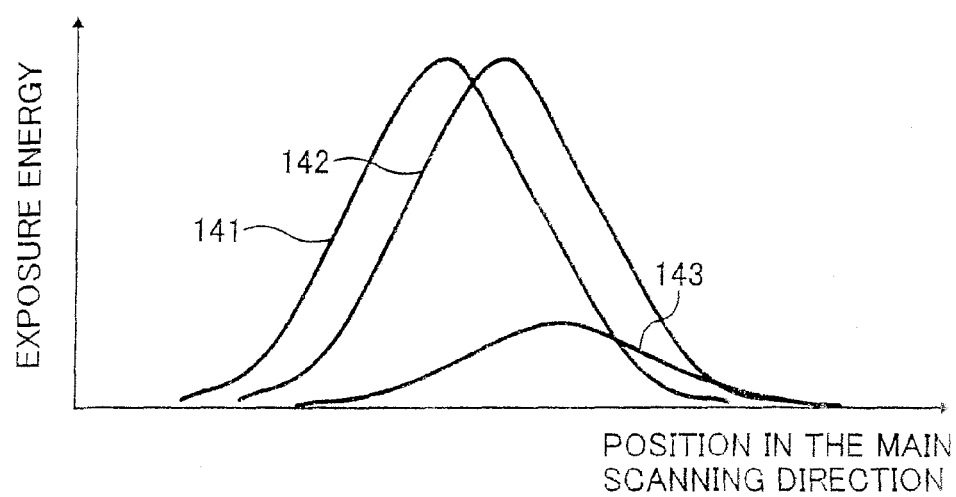
FIG. 14 is a schematic illustration of distribution of exposure energy provided to a latent image bearing member when writing is performed on the pixel shown in FIG. 10.

FIG. 14 shows beam profiles 141, 142, and 143 of light beams incident on the pixel shown in FIG. 10. A horizontal axis represents a position in the main scanning direction. A vertical axis represents exposure energy.

An emission coefficient for the sub-pixel on which a light beam having a width of one quarter is shown as ¼, and approximation is performed on the assumption that a light beam having exposure energy of one quarter of an ordinary amount is emitted for the sub-pixel. As a result, distribution of exposure energy is obtained. The distribution may be slightly different from actual distribution, but the difference may be tolerable.

The calculation of a developer consumption further focusing on overlapping of light beams in the sub-scanning direction is described below referring to FIGS. 15 to 19.

Figure 15:
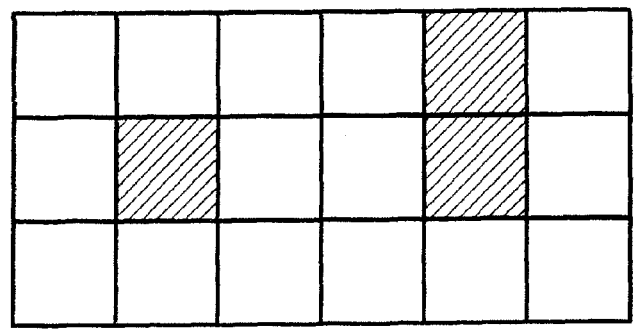
FIG. 15 is a schematic illustration of another arrangement of pixels included in an image to be formed by an image forming apparatus.
Figure 16:
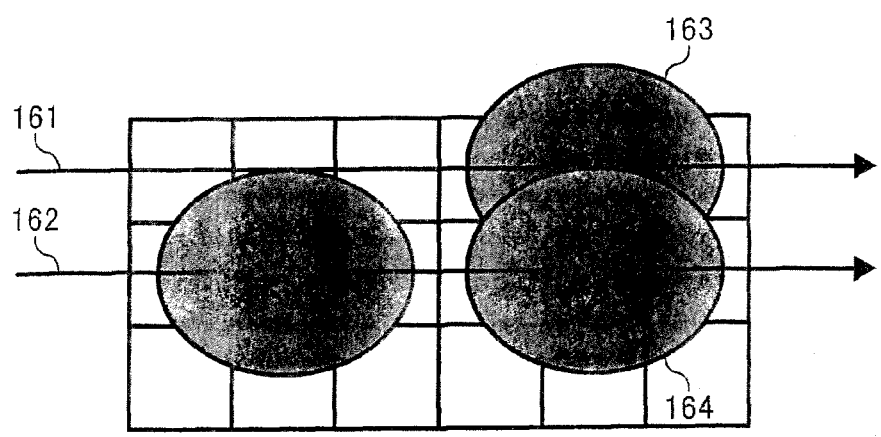
FIG. 16 is a schematic illustration of spots in a latent image to be formed when writing is performed on the pixels shown in FIG. 15.

FIG. 15 schematically illustrates another arrangement of pixels included in an image to be formed by an image forming apparatus. Hatched pixels represent the pixels on which writing is performed by using a light beam having the diameter shown in FIG. 2. FIG. 16 illustrates spots in a latent image formed on the respective hatched pixels shown in FIG. 15 when writing is performed thereon.

As shown in FIG. 15, two of the hatched pixels are located next to each other in the sub-scanning direction (i.e. a vertical direction in FIG. 15). As shown in FIG. 16, when writing is performed along a "N"th scanning line 162, a spot 164 is formed. When writing is performed along a scanning line 161, which is performed immediately before the writing along the "N"th scanning line 162 (i.e. the scanning line 161 is placed at the (N−1)th), a spot 163 is formed. The spots 163 and 164 overlap each other.

Figure 17:
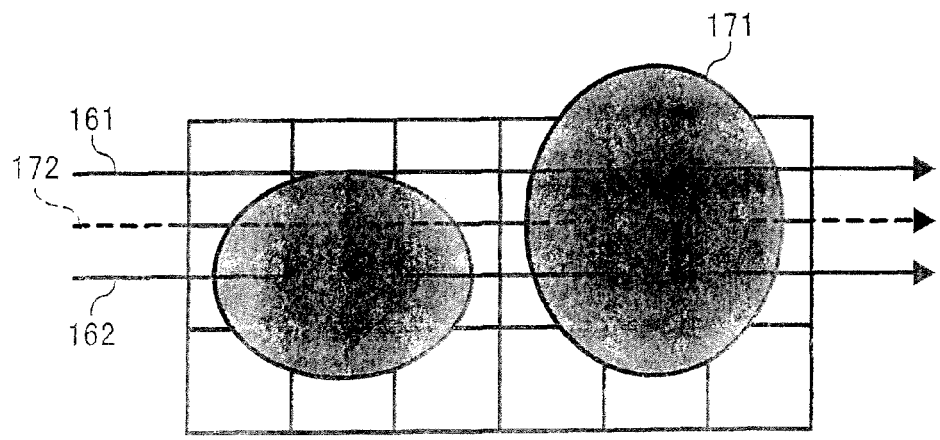
FIG. 17 is a schematic illustration of actual spots in an actual latent image to be formed when writing is performed as shown in FIG. 16.

FIG. 17 illustrates actual spots in an actual latent image shown in FIG. 16. In actual latent image forming, the spots 163 and 164 are formed as one synthesized spot 171 as shown in FIG. 17. A line 172 passes through the center of the synthesized spot 171.

Figure 18:
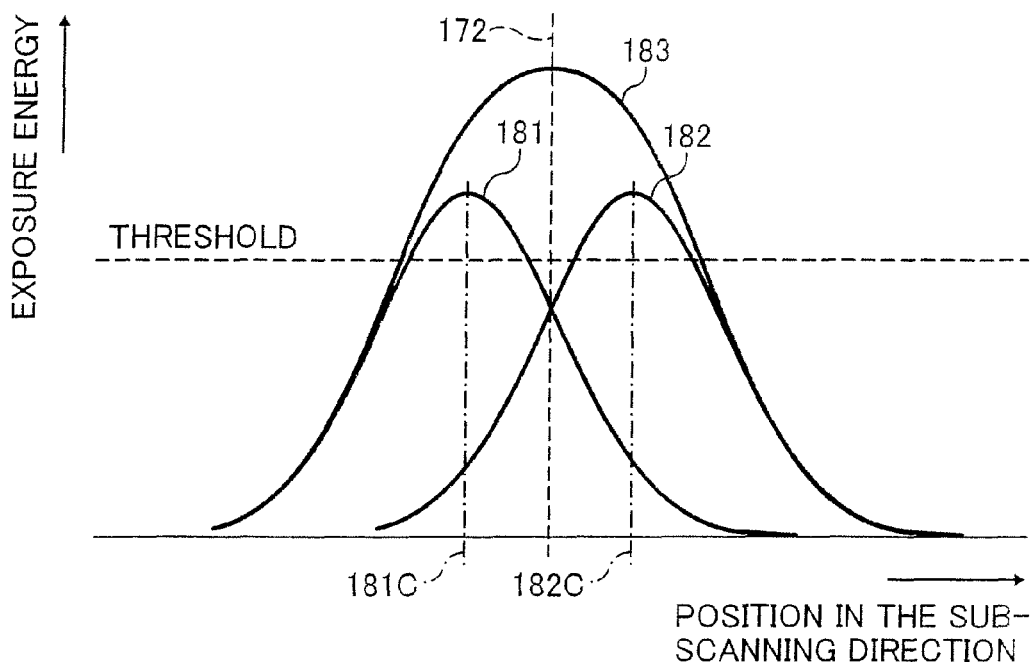
FIG. 18 is a schematic illustration of distribution of exposure energy in the sub-scanning direction on a line passing through the center of a synthesized spot shown in FIG. 17.

FIG. 18 illustrates distribution of exposure energy in the sub-scanning direction on the line 172. A horizontal axis represents positions in the sub-scanning direction. A vertical axis represents exposure energy.

Solid lines 181 and 182 represent the distribution of exposure energy in one embodiment in which the spots 163 and 164 are independently formed as shown in FIG. 17. Alternate long and short dashed lines 181C and 182C indicate respective centers of the scanning lines 161 and 162 in the sub-scanning direction. A solid line 183 represents the distribution of exposure energy of the synthesized spot 171 which is the sum of the distribution represented by the solid lines 181 and 182.

Intensity of the light beams are set such that the development threshold is placed as shown in FIG. 18. With the intensity setting, when writing is independently performed along a single scanning line, a spot can be independently formed according to the writing. Further, when writing is consecutively performed along two scanning lines, an uninterrupted spot can be formed.

As described above referring to FIG. 7, when exposure energy is in the range B, the relationship between a developer consumption and the exposure energy is substantially linear. Therefore, as long as exposure energy is not in the range C, the developer consumption when the exposure energy is as shown in FIG. 18 is substantially proportional to an area of the part of the graph shown in FIG. 18 exceeding the development threshold. As a result, as easily understood from FIG. 18, the developer consumption in an embodiment in which writing is performed on two consecutive pixels in the sub-scanning direction is not equal to the developer consumption in an embodiment in which writing is independently performed on two isolated pixels.

Therefore, in order to detect a developer consumption in image forming, in addition to the developer consumption upon writing along a single scanning line such as the scanning line 161 and the scanning line 162 shown in FIGS. 17 and 18, a line such as the line 172 on which spots overlap to each other is preferably taken into account so that a developer consumption corresponding to the overlapping can be obtained.

A method of calculating a developer consumption further focusing on the overlapping of light beams in the sub-scanning direction is described below. The calculation method is based on the developer consumption determining method described above referring to FIGS. 8 to 14.

When a light beam having a diameter of 80 μm in the sub-scanning direction as shown in FIGS. 2 and 16 is used in 600 dpi writing, writing along a scanning line has an impact on exposure energy only on adjacent lines in the sub-scanning direction. Therefore, in order to detect a developer consumption with consideration of the impact, overlapping of light beams incident on adjacent two scanning lines needs to be taken into account.

In the calculation method, the width of a pixel in the sub-scanning direction is divided into equal halves.

Figure 19:
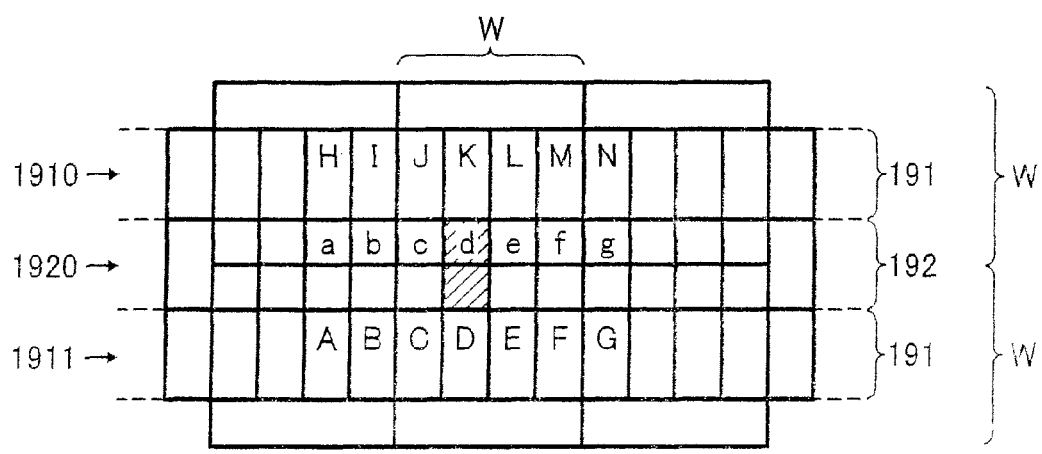
FIG. 19 is a schematic illustration of exemplary scanning sub-pixels and overlapping sub-pixels made by dividing pixels.

FIG. 19 illustrates exemplary scanning sub-pixels and overlapping sub-pixels used in the calculation method. Scanning sub-pixels 191 are located at the center of pixels in the sub-scanning direction, each having a width half a width W of a pixel in the sub-scanning direction. overlapping sub-pixels 192 are located between scanning sub-pixels and the next scanning sub-pixels in the sub-scanning direction. An arrow 1910 indicates a (N−1)th scanning line. An arrow 1920 indicates an overlapping line. An arrow 1911 indicates a "N"th scanning line. In the calculation method, exposure energy received by the sub-pixels upon writing is derived to obtain a developer consumption corresponding to the derived exposure energy.

Calculation of a developer consumption corresponding to exposure energy on a scanning sub-pixel is omitted since the developer consumption can be obtained according to the method described above referring to FIGS. 8 to 14.

A developer consumption corresponding to exposure energy on one of the overlapping sub-pixels 192, which is featured for calculation and hereinafter referred to as an overlapping sub-pixel d, is described below. The overlapping sub-pixel d is assumed to receive exposure energy when a light beam is incident at positions of scanning sub-pixels within a predetermined distance from the overlapping sub-pixel d. In the calculation method according to the embodiment, the predetermined distance includes preceding three scanning sub-pixels and succeeding three scanning sub-pixels of the overlapping sub-pixel d.

In other words, when the overlapping sub-pixel "d" is featured for calculation in one embodiment shown in FIG. 19, light beams shown at positions of scanning sub-pixels A to N are assumed to have impacts on exposure energy received by the overlapping sub-pixel "d". Exposure energy on the overlapping sub-pixel "d" is calculated as a total sum of the exposure energy received by the overlapping sub-pixel "d".

The calculation is performed by summing up emission coefficients multiplied by weighting coefficients. In detail, when EnOL represents exposure energy to be received by an overlapping sub-pixel located at the "n"th on the overlapping line of the arrow 1920 between the (N−1)th scanning line of the arrow 1910 and the "N"th scanning line of the arrow 1911, the exposure energy EnOL can be derived as follows:

$$EnOL = P(n-3, N-1)*s3 + P(n-2, N-1)*s2 +$$
$$P(n-1, N-1)*s1 + P(n, N-1)*16 +$$
$$P(n+1, N-1)*s1 + P(n+2, N-1)*s2 +$$
$$P(n+3, N-1)*s3 + P(n-3, N)*s3 +$$
$$P(n-2, N)*s2 + P(n-1, N)*s1 + P(n, N)*16 +$$
$$P(n+1, N)*s1 + P(n+2, N)*s2 + P(n+3, N)*s3$$

<Formula 3> wherein P(n,N) represents an emission coefficient of the "n"th scanning sub-pixel on the "N"th scanning line, s1, s2, and s3 represent weighting coefficients determined by a register.

The emission coefficient can be determined referring to image data of three pixels including a pixel having the featured sub-pixel, the preceding pixel thereof, and the succeeding pixel thereof on two scanning lines including a preceding scanning line and a succeeding scanning line of the featured sub-pixel (i.e. 2 lines×3 pixels) as in the method described above referring to FIGS. 8 to 14

Further, the weighting coefficients can be determined by obtaining exposure energy through approximation of the beam profile of a light beam as in one embodiment shown in FIG. 8 according to the positional relationship between a sub-pixel in which the center of the light beam is located and a featured sub-pixel.

In this embodiment, since the beam profile is symmetric both in the main scanning and sub-scanning directions on an axis of symmetry which passes through the center of the light beam, it is assumed in formula 3 that the weighting coefficients for sub-pixels having a symmetrical positional relationship on an axis of symmetry which passes through a featured sub-pixel have the same values for easy calculation.

Further, the weighting coefficient having a value of 16 by which P(n, N−1) and P(n, N) are multiplied is one half of the weighting coefficient by which P(n) is multiplied in formula 2 in the case of a scanning sub-pixel, because in the case of an overlapping sub-pixel, the number of terms to be summed up is two times the number of terms in the case of the scanning sub-pixel. Therefore, an entire value is reduced so that the number of bits to be used to store a result of the calculation is reduced. Actually, exposure energy provided to the overlapping sub-pixel d by a light beam incident at a position of the scanning sub-pixel D is thought to be approximately one half of exposure energy received by the scanning sub-pixel D.

The weighting coefficient by which P(n, N−1) and P(n, N) are multiplied may be appropriately set as in the case of the weighting coefficient by which P(n) is multiplied in formula 2.

The developer consumptions of respective sub-pixels are obtained by converting exposure energy on the respective sub-pixels derived by using formula 3 by using the relationship shown in FIG. 7 as in this embodiment of scanning sub-pixels. It should be noted that the weighting coefficients to be used in the calculation of exposure energy on overlapping sub-pixels may not be determined upon the same standard as standard upon which the weighting coefficients used for calculating exposure energy on scanning sub-pixels are determined. Therefore, a development threshold and an upper limit value are preferably determined differently from the development threshold and the upper limit value used for scanning sub-pixels.

When the developer consumption of one pixel corresponding to overlapping of scanning lines needs to be obtained, in the example shown in FIG. 19, for example, the developer consumptions of the respective overlapping sub-pixels c, d, e, and f are calculated, and are summed up.

The developer consumption in one page can be obtained by calculating the developer consumptions of all scanning sub-pixels and all overlapping sub-pixels included in the one page and by summing up the derived developer consumptions. In this embodiment, numerical values derived by the calculation do not have the same meaning as the numerical values derived by using the method described above referring to FIGS. 8 to 14. However, the numeral values in this embodiment can be converted into units such as gram, milliliter, and mol after being multiplied by an appropriate constant. Further, when a numerical value to which the amount of developer in a developer package corresponds is known, the result of the above calculation can be used without any problem.

Further, the result of the calculation can be used to inform a user of a shortage of developer so that the user can prepare for replenishment of the developer, or request a service base to deliver a developer package for replacement, as in the embodiment described above referring to FIGS. 8 to 14.

The significance of an impact of a result of calculation related to overlapping line to be put on the entire developer consumption varies depending on the beam profile (particularly, the diameter) of a light beam, an image forming process, and so forth. Therefore, it is preferable that respective results of calculation for a scanning line and an overlapping line are weighted to determine respective weighting coefficients, and a developer consumption calculated for scanning sub-pixels and a developer consumption calculated for overlapping sub-pixels are summed up after being multiplied by the respective weighting coefficients.

The developer consumption on one page can be calculated, for example, as follows:

DEVELOPER CONSUMPTION ON ONE PAGE="WEIGHTING COEFFICIENT FOR SCANNING LINE"* Σ("EXPOSURE ENERGY ON SCANNING SUB-PIXEL"–"DEVELOPMENT THRESHOLD FOR SCANNING LINE")+"WEIGHTING COEFFICIENT FOR OVERLAPPING LINE"* Σ("EXPOSURE ENERGY ON OVERLAPPING SUB-PIXEL"–"DEVELOPMENT THRESHOLD FOR OVERLAPPING LINE")  <Formula 4> wherein Σ represents summation on all sub-pixels included in the one page.

The weighting coefficients for a scanning line and an overlapping line can be determined by simulation of superimposing of beam profiles at intervals of scanning lines. Alternatively, the weighting coefficients can be determined through an experiment. In the experiment, for example, a developer consumption cA in one page alternately having two types of lines, filled-in solid lines and blank lines, and a developer consumption cB in one page consisting of only filled-in solid lines are obtained. A ratio of a weighting coefficient for a scanning line to a weighting coefficient for an overlapping line can be derived as follows:

"DEVELOPER CONSUMPTION ON SCANNING LINES": "DEVELOPER CONSUMPTION ON OVERLAPPING LINES"=$cA:cB/2-cA$

Alternatively, a developer consumption cC in one image consisting of a single line and a developer consumption cD in one image consisting of neighboring two lines may be obtained. In this embodiment, a ratio of a weighting coefficient for a scanning line to a weighting coefficient for an overlapping line can be derived as follows:

"DEVELOPER CONSUMPTION ON SCANNING LINES": "DEVELOPER CONSUMPTION ON OVERLAPPING LINES"=$cC:cD-2*cC$

A developer consumption can be precisely detected by performing calculation by using the weighting coefficients derived as described above.

The developer consumption determining method described above may be performed on a computer including a CPU, a ROM, a RAM, and so forth by causing the CPU to execute a predetermined program and inputting image data of an image to be formed so that the above calculation is performed on the image data.

However, the step of calculating exposure energy on respective sub-pixels and developer consumptions of the respective sub-pixels, and summing up the result of calculation includes repetition of fixed calculation. Therefore, causing a dedicated hardware component such as an application specific integrated circuit (hereinafter, referred to as ASIC) to perform the step may achieve a cost reduction and an increase in speed.

Figure 20:
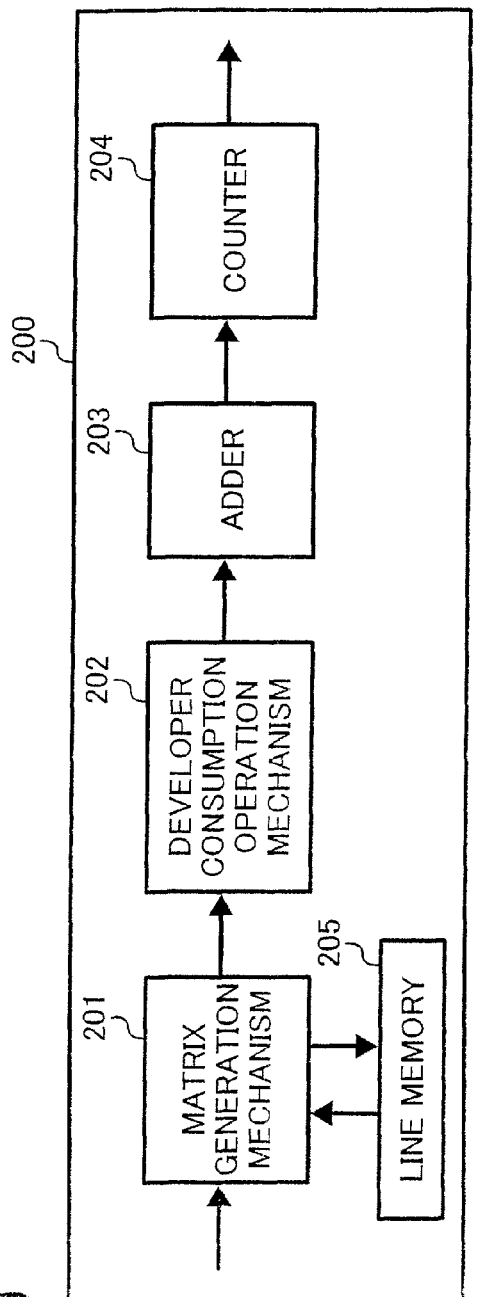
FIG. 20 is a block diagram illustrating an exemplary configuration of an application specific integrated circuit (ASIC) for performing a developer consumption determining method according to an embodiment of the present invention.

FIG. 20 illustrates an exemplary configuration of an ASIC for performing the step.

As shown in FIG. 20, an ASIC 200 includes a matrix generation mechanism 201, a developer consumption operation mechanism 202, an adder 203, a counter 204, and a line memory 205 for storing preceding line data.

In order to cause the ASIC 200 to execute the calculation of a developer consumption, a weighting coefficient, a development threshold, and a needed value are set in a register to be referred to by the developer consumption operation mechanism 202, and image data of an image to be formed is input in the matrix generation mechanism 201. The matrix generation mechanism 201 causes the line memory 205 to sequentially store input image data so that the input image data can be used for calculation of a next line, while reading out image data of a preceding line from the line memory 205. Then, a matrix of image data of pixels including a featured pixel, a preceding pixel and a succeeding pixel of the featured pixel, and corresponding pixels on a preceding scanning line (3 pixels in the main scanning direction×2 lines in the sub-scanning direction) is input to the developer consumption operation mechanism 202.

It is preferably that image data indicating that a light beam is not incident is previously stored as an initial value in the line memory 205 so that the matrix of image data can be generated even when a featured pixel is located on a first line. Further, it is also preferable that in the case in which the preceding pixel or the succeeding pixel of the featured pixel is located off an image area, image data indicating that a light beam is not incident on the pixel is input to the developer consumption operation mechanism 202.

The developer consumption operation mechanism 202 performs addition of exposure energy, subtraction of a threshold, and so forth as described above on respective scanning sub-pixels of the featured pixel and respective overlapping sub-pixels located between the featured pixel and the pixel on the preceding line to obtain a developer consumption. In other words, an emission coefficient for each sub-pixel is derived from the image data, exposure energy on the respective scanning sub-pixels of the featured pixel and the respective overlapping sub-pixels is calculated. An operation is performed by using the threshold and an upper limit value to obtain converted values of developer consumptions.

The obtained developer consumptions on the scanning sub-pixels and the obtained developer consumptions of the overlapping sub-pixels are separately summed up for each pixel, and are input to the adder 203. The developer consumption operation mechanism 202 can perform the operation within one pixel clock.

The adder 203 separately adds the developer consumptions on the scanning sub-pixels and the developer consumptions on the overlapping sub-pixels each time the developer consumption on each pixel is input, and accumulates the results. When the accumulated result exceeds a predetermined value and overflows, a carry occurs.

As the counter 204 counts carries, total developer consumptions are separately calculated for scanning lines and overlapping lines. The calculated total developer consumptions are stored in a register, and are externally read out by a CPU. The CPU weights and sums up the total developer consumptions so that a developer consumption in one page can be obtained. Developer consumptions in respective pages are accumulatively added so that a cumulative value of the developer consumptions is obtained.

In one embodiment in which the calculation focuses on overlapping of light beams only in the main scanning direction, image data to be input from the matrix generation mechanism 201 to the developer consumption operation mechanism 202 includes only three pixels in the main scanning direction on one line. Therefore, the line memory 205 is not needed. Further, since the concept of overlapping sub-pixels is not used in this embodiment, the operation of developer consumptions and counting need to be performed only on scanning sub-pixels.

Alternatively, the developer consumption operation mechanism 202 may input a developer consumption on each sub-pixel to the adder 203 for accumulation.

Even when the ASIC 200 is not used, the developer consumption determining method may be performed on an independent developer consumption determining apparatus including a CPU, a ROM, a RAM, and so forth. Alternatively, an image forming apparatus may be provided with a developer consumption detection mechanism so that the developer consumption determining method can be performed on the image forming apparatus. In this embodiment, the image forming apparatus may be configured to calculate the amount of developer to consume, and to detect when the developer in a developer package in the image forming apparatus becomes empty.

Figure 21:
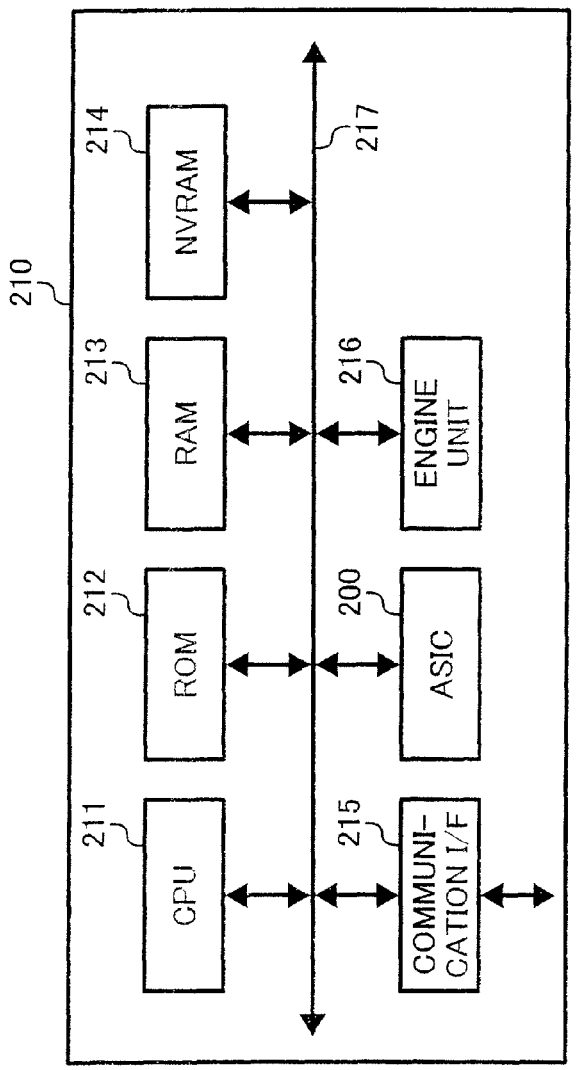
FIG. 21 is a block diagram illustrating an exemplary hardware configuration of an image forming apparatus including a mechanism for performing the developer consumption determining method according to an embodiment of the present invention.

FIG. 21 illustrates an exemplary hardware configuration of an image forming apparatus 210 including the ASIC 200. As shown in FIG. 21, the image forming apparatus 210 includes a CPU 211, a ROM 212, a RAM 213, a non-volatile RAM (NVRAM) 214, a communication interface (I/F) 215, the ASIC 200, and an engine unit 216, which are all connected via a system bus 217.

The CPU 211 serves as a control mechanism for controlling the entire image forming apparatus 210. The CPU 211 executes various program stored in the ROM 212 and the NVRAM 214 to function as mechanisms such as a developer consumption detection mechanism.

The ROM 212 includes a non-volatile memory storing the program to be executed by the CPU 211, fixed parameters, and so forth. Alternatively, the ROM 212 may be configured to be a rewritable memory so that data stored therein can be updated.

The RAM 213 includes a memory to be used for storing data to be temporarily used, and to be used as a work memory.

The NVRAM 214 includes a rewritable non-volatile memory such as a flash memory and a secure digital (SD) memory, and stores the programs to be executed by the CPU 211 and parameter values such as weighting coefficients and emission coefficients which are used for the detection of a developer consumption and need to be retained even after the image forming apparatus 210 is turned off.

The communication I/F 215 includes an interface which enables the image forming apparatus 210 to communicate with an external apparatus. Examples of the communication I/F 215 include a network interface for a communication with an Ethernet® method, an interface according to a Universal Serial Bus (USB) standard, and so forth.

The ASIC 200 is a circuit for performing the calculation for the detection of a developer consumption as shown in FIG. 21, and is included in the developer consumption detection mechanism.

The engine unit 216 includes at least a print engine which serves as an image forming mechanism for forming an image by developing a latent image formed by scanning with a light beam. The engine unit 216 further includes a scanner engine, an automatic document feeder, a sorter, a finisher, and so forth depending on functions of the image forming apparatus 210.

In the image forming apparatus 210, the CPU 211 provides the ASIC 200 with the image data for causing the print engine to perform image forming, and causes the ASIC 200 to detect the amount of developer to be consumed by print operation of the print engine. Further, the CPU 211 can obtain a cumulative value of developer consumptions by accumulating results of the detection. In this sense, the CPU 211 also functions as a part of the developer consumption detection mechanism.

Running out of a developer and forthcoming running out thereof may be notified according to the cumulative value. In this embodiment, since the developer consumptions can be precisely detected according to the developer consumption determining method, a sensor for physically sensing the state of a developer package such as a toner bottle and a process cartridge is not needed. As a result, a reduction in the cost of manufacturing an apparatus can be achieved.

An image forming apparatus using a background developer consumption determining method needs to use a sensor even when the image forming apparatus performs the detection of developer consumptions according to the contents of images to be formed, because the developer consumptions are not precisely detected. When the detection of a developer consumption is not precisely performed, a warning message is provided even when an amount of a remaining developer is not small, or not provided even when no developer remains.

On the contrary, since the developer consumption determining method of the present invention achieves sufficient precision without using a sensor.

Further, a developer package may be provided with a rewritable non-volatile memory so that information on how much developer is consumed can be stored therein. In this embodiment, when a plurality of image forming apparatuses sequentially use the developer package, the plurality of image forming apparatuses can refer to the stored information to precisely know the amount of a remaining developer.

According to the embodiment of the present invention as described above, since a developer consumption is calculated in consideration of overlapping of light beams in a latent image, even when a spot formed by a light beam for writing is located off a pixel, of which impact can be taken into account for the detection of a developer consumption. As a result, developer consumption can be precisely detected according to the contents of an image to be formed.

Further, when the distribution of latent images according to overlapping of light beams is calculated, and a developer consumption is derived by using the result of the calculation of the distribution, precision of the detection may be further enhanced.

Further, when the amount of developer consumed during scanning on one line and the amount of developer consumed in an overlapping area of adjacent scanning lines are separately calculated, a developer consumption can be easily derived according to the result of the calculation with high precision and consideration of overlapping of light beams located off pixels.

Further, a two-dimensional area in which an image is formed is divided, in both the main and sub-scanning directions, into sub-pixels in a matrix form which are smaller than writing pixels in at least one of the main and sub-scanning directions, and the distribution of latent images according to overlapping of light beams incident on respective sub-pixels is calculated. A developer consumption can be easily derived according to the obtained distribution with high precision and consideration of overlapping of light beams located off pixels.

Further, a pixel is divided in width in the main scanning direction into a plurality of scanning sub-pixels, and values multiplied by respective coefficients and respective emission coefficients are derived for the respective scanning sub-pixels located within a predetermined distance from a featured scanning sub-pixel. The values are summed up to derive exposure energy on the respective sub-pixels so that a developer consumption can be obtained by using the derived exposure energy. In this embodiment, the detection of a developer consumption can be achieved by repetition of simple processing in consideration of overlapping of light beams in the main scanning direction without recognizing dot patters of pixels surrounding a featured pixel. As a result, precise detection can be performed at a high speed by using an inexpensive operation circuit.

Although, exposure energy is assumed to represent an amount of exposure in the example described above as an embodiment of the present invention, any one of other parameters can be used to calculate an amount of exposure as long as a relationship between the one and a developer consumption can be presented.

Further, a pixel is divided in width in the sub-scanning direction into a scanning sub-pixel corresponding to a scanning line and an overlapping sub-pixel corresponding to overlapping of light beams for scanning adjacent scanning lines, and values multiplied by respective coefficients and respective emission coefficients are derived for the respective scanning sub-pixels which are adjacent to a featured overlapping sub-pixel and are located within a predetermined distance from the featured overlapping sub-pixel, and are summed up. The amounts of exposure on respective overlapping sub-pixels are calculated according to the summed values, and a developer consumption is derived by using the calculated amounts. As a result, the detection of a developer consumption can be achieved by repetition of simple processing in consideration of overlapping of light beams in the sub-scanning direction.

Further, when both the amount of exposure on a scanning sub-pixel and the amount of exposure on an overlapping sub-pixel are calculated as described above to derive a developer consumption by using the amounts, the detection of the developer consumption can be achieved by repetition of simple processing in consideration of overlaying of light beams both in the main and sub-scanning directions. In this embodiment, when the amounts of exposure on a sub-pixel are weighted depending to whether the sub-pixel is the scanning sub-pixel or the overlapping sub-pixel, and summed up, precision of the detection can be enhanced with consideration of how light beams overlap.

Further, when a coefficient for the weighting is determined according to a beam profile in the sub-scanning direction, precision of the detection can be enhanced with consideration of actual writing.

Further, a value of a weighting coefficient by which an emission coefficient is multiplied is determined according to approximation of a beam profile, precision of the detection can be enhanced with consideration of actual writing.

Further, when weighting coefficients corresponding to respective positions are determined such that values thereof have a symmetric form in the main scanning direction, the number of registers for storing the weighting coefficients can be reduced, and a configuration of an apparatus for performing the developer consumption determining method can be simplified.

Further, when the amounts of exposure on respective sub-pixels are obtained by multiplying values by respective weighting coefficients and respective emission coefficients, summing up the values, taking parts of the summed values which exceed a predetermined threshold, and using the parts of the summed value for calculation, precision of the detection can be enhanced with consideration of the relationship between the actual amount of exposure and the amount of developer which adheres to a latent image bearing member.

In this embodiment, when the predetermined threshold has a value representing a minimum amount of exposure with which a ratio of an increase in the amount of developer consumption to an increase in the amount of exposure exceeds a predetermined standard, the relationship between the amount of exposure and the amount of developer which adheres to a latent image bearing member can be better taken into account.

Further, when a value obtained by summing up values multiplied by respective weighting coefficients and respective emission coefficients exceeds a predetermined upper value, the predetermined upper value is used for calculation. As a result, precision of the detection can be enhanced with consideration of the relationship between the actual amount of exposure and the amount of developer which adheres to a latent image bearing member.

In this embodiment, when the predetermined upper value is assigned with a value representing the amount of exposure with which the ratio of an increase in the amount of developer consumption to an increase in the amount of exposure hits a peak, the relationship between the amount of exposure and the amount of developer which adheres to a latent image bearing member can be better taken into account.

The present invention is not limited to the embodiment described above in terms of procedures, formulae, sizes and shapes of pixels and beam spots, division of sub-pixels, and so forth.

Alternatively, for example, when a converted value of a developer consumption is obtained from exposure energy derived for each sub-pixel, a development threshold or an upper value is not used, and a table in which the relationship between exposure energy and a converted value is determined may be prepared so that the converted value can be derived by referring to the table. In this embodiment, although an extra memory space is needed for storing the table, precision of the relationship between exposure energy and a converted value can be enhanced. As a result, precision of the detection can be enhanced. Further, when the ASIC 200 is manufactured, the table can be stored in, for example, the developer consumption operation mechanism 202, or in a memory which can be referred to by the developer consumption operation mechanism 202.

Further, the width of an area used for approximation of a beam profile as shown in FIG. 8 and the width of a sub-pixel are not limited to approximately 10 µm. The widths can be properly set in consideration of a calculation volume, required precision, the number of pixels per inch, and so forth. In addition, the width of the area is not necessarily equal to the width of a sub-pixel. As long as the width of the area is an integral multiple of the width of a sub-pixel, a plurality of sub-pixels can share a single weighting coefficient. Even when the width of the area is not an integral multiple of the width of a sub-pixel, interpolation may be properly performed, or a weighting coefficient for the closest area may be used so that the detection can be achieved.

Further, the number of sub-pixels into which a pixel is divided in the main scanning direction is not limited to four. Further, in one embodiment in which an overlapping sub-pixel is created for calculation, a pixel may be divided into three or more in the sub-scanning direction so that a plurality of lines having overlapping sub-pixels are created for one scanning line. In this embodiment, emission coefficients for a scanning line closer to the overlapping sub-pixels and a scanning line not closer thereto may be multiplied by different weighting coefficients.

Further, when a pixel is divided into a scanning sub-pixel and an overlapping sub-pixel, even when the pixel is not divided in the main scanning direction, a minimum necessary effect can be achieved.

Further, the present invention may also be applied to detection of a developer consumption in image writing by raster scanning with a laser beam. In addition, the present invention may also be applied to detection of a developer consumption in image writing by solid writing by using a light emitting diode array (LEDA). In this embodiment, light beams emitted from respective LEDs are considered to have respective beam profiles.

Further, in one embodiment of color image forming using a plurality of colors of developers, respective developer consumptions can be detected by performing calculation according to the above method for the respective colors. In this embodiment, since laser beam outputs and properties of the developers may be different depending on the colors, it is preferable that weighting coefficients, development threshold, upper limit values, and so forth can be set for each of the colors.

Further, the various examples described above may be applied in combination as long as consistency is ensured.

What is claimed as new and desired to be secured by Letters Patent of the United States is:

1. A developer consumption determining method for determining, using a developer consumption detection mechanism, a developer consumption of an image forming apparatus which forms an image by developing a latent image formed on an image bearing member by scanning with light beams in a main scanning direction while rotating the image bearing member in a sub-scanning direction to form light beam spots on the image bearing member, which are overlapped in the main scanning direction and the sub-scanning direction and include writing pixels, comprising the steps of:
   dividing, using the developer consumption detection mechanism, one of the writing pixels into a plurality of scanning sub-pixels in the main scanning direction and a plurality of overlapping sub-pixels in the sub-scanning direction, the plurality of overlapping sub-pixels being sub-pixels on which the light beam spots overlap in the sub-scanning direction;
   determining, using the developer consumption detection mechanism, a weighting coefficient for each of a plurality of surrounding scanning sub-pixels of one of the plurality of overlapping sub-pixels, which are on a scanning line adjacent to the one of the plurality of overlapping sub-pixels, and are located within a predetermined distance from the one of the plurality of overlapping sub-pixels. on the basis of respective positional relationships of the plurality of scanning sub-pixels with the one of the plurality of overlapping sub-pixels;
   determining, using the developer consumption detection mechanism, respective emission coefficients for the plurality of scanning sub-pixels on the basis of one of a plurality of durations and exposures of the light beams applied to each of the plurality of scanning sub-pixels;
   summing products of the weighting coefficients of the plurality of scanning sub-pixels and the respective emission coefficients to determine a total exposure for the one of the plurality of overlapping sub-pixels:
   repeating for all of the plurality overlapping sub-pixels the steps of determining the weighting coefficient, determining respective emission coefficients, and summing products;
   summing the total exposures for all the overlapping sub-pixels to determine a developer consumption attributed to the overlapping of light beam spots in the sub-scanning direction; and
   determining using the developer consumption detection mechanism, the developer consumption of the image forming apparatus by using the developer consumption attributed to the overlapping of light beam spots in the sub-scanning direction.

2. The developer consumption determining method according to claim 1 wherein summing the total exposures for all the plurality of sub-pixels to determine the developer consumption, only uses exposures greater than a predetermined threshold.

3. The developer consumption determining method according to claim 2, wherein the predetermined threshold is set to a value at which a ratio of an increase of the developer consumption to an increase of the exposure exceeds a predetermined value.

4. The developer consumption determining method according to claim 1, wherein the weighting coefficient is determined on the basis of a beam profile of the light beams.

5. The developer consumption determining method according to claim 1, wherein the weighting coefficient of one of the plurality of surrounding sub-pixels is the same as that of another one of the plurality of surrounding sub-pixels when distances between the two of the plurality of surrounding sub-pixels and the one of the plurality of sub-pixels are the same.

6. The developer consumption determining method according to claim 1, wherein when any one of the plurality of exposures exceeds a predetermined upper exposure value, a predetermined upper exposure value is used instead of the one of the plurality exposures.

7. The developer consumption determining method according to claim 6, wherein the predetermined upper exposure value is set to a value at which a ratio of an increase of the developer consumption to an increase of the exposure is lower than a predetermined value.

8. An image forming apparatus, comprising:
   an image bearing member configured to rotate in a sub-scanning direction;
   a latent image forming device configured to scan the image bearing member with a light beam in a main scanning direction such that beam spots on the image bearing member are partially overlapped in at least the main scanning direction to form a latent image on the image bearing member;
   a developing device configured to develop the latent image with a developer to form a visual image on the image bearing member; and
   the developer consumption detection mechanism configured to detect a developer consumption for the visual image by the developer consumption determining method according to claim 1.

9. A developer consumption determining apparatus for determining a developer consumption of an image forming apparatus which forms an image by developing a latent image formed on an image bearing member by scanning with light beams in a main scanning direction while rotating the image bearing member in a sub-scanning direction to form light beam spots the image bearing member, which are overlapped in the main scanning direction and the sub-scanning direction and include writing pixels, comprising:
   a mechanism configured to obtain image data of the image to be used for forming a latent image; and the developer consumption detection mechanism configured to calculate the developer consumption on the basis of the image data using the develop consumption determining method according to claim 1.

10. A developer consumption determining method for determining, using a developer consumption detection mechanism, a developer consumption of an image forming apparatus which forms an image by developing a latent image formed on an image bearing member by scanning with light beams in a main scanning direction while rotating the image bearing member in a sub-scanning direction to form light beam spots on the image bearing member, which are overlapped in the main scanning direction and the sub-scanning direction and include writing pixels, comprising the steps of:

dividing, using the developer consumption detection mechanism, one of writing pixels into a plurality of scanning sub-pixels in the main scanning direction and plurality of overlapping sub-pixels in the sub-scanning direction, the plurality of overlapping sub-pixels being sub-pixels on which the light beam spots overlap in the sub-scanning direction;

determining, using the developer consumption detection mechanism, a weighting coefficient or each of a plurality of surrounding scanning sub-pixels of one of the plurality of scanning sub-pixels, which are on the same scanning line as the one of the plurality of scanning sub-pixels, and are located within a predetermined distance from the one of the plurality of scanning sub-pixels, on the basis of respective positional relationships of the plurality of scanning sub-pixels with the one of the plurality of scanning sub-pixels;

determining, using the developer consumption detection mechanism, respective emission coefficients for the plurality of scanning sub-pixels on the basis of one of a plurality of durations and exposures of the light beams applied to each of the plurality of scanning sub-pixels;

summing products of the weighting coefficients the plurality of scanning sub-pixels and the respective emission coefficients to determine total exposure for the one of the plurality of scanning sub-pixels:

determining, using the developer consumption detection mechanism a weighting coefficient for each of the plurality of surrounding scanning sub-pixels of one of the plurality of overlapping sub-pixels, which are on a scanning line adjacent to the one of the plurality of overlapping sub-pixels, and are located within a predetermined distance from the one of the plurality of overlapping sub-pixels, on the basis of respective positional relationships of the plurality of scanning sub-pixels with the one of the plurality of overlapping sub-pixels;

determining, using the developer consumption detection mechanism, respective emission coefficients for the plurality of scanning sub-pixels on the basis of one a plurality of durations and exposures of each of the light beams applied to the plurality of scanning sub-pixels;

summing products of the weighting coefficients of the plurality of scanning sub-pixels and the respective emission coefficients to determine a total exposure for the one of the plurality at overlapping sub-pixels;

repeating for all of the plurality of overlapping sub-pixels the steps of determining the weighting coefficient, determining respective emission coefficients, and summing products; and summing the total exposures for all the plurality of scanning sub-pixels and the plurality of overlapping sub-pixels to determine the developer consumption.

11. The developer consumption determining method according to claims 10, wherein when the amounts of exposure of the plurality of scanning sub-pixels and the plurality overlapping sub-pixels are summed up, the weighting coefficients of the plurality at sub-pixels are determined depending on whether the sub-pixel is the scanning sub-pixel or the overlapping sub-pixel.

12. The developer consumption determining method according to claim 11, wherein the weighting coefficients of the sub-pixels are determined depending on beam profile of the light beam in the sub-scanning direction.

13. A developer consumption determining apparatus for determining a developer consumption of an image forming apparatus which forms an image by developing a latent image formed on an image bearing member by scanning with light beams in a main scanning direction while rotating the image bearing member in a sub-scanning direction to form light beam spots on the image bearing member, which are overlapped in the main scanning direction and the sub-scanning direction and include writing pixels, comprising:

a mechanism configured to obtain image data of the image to be used for forming a latent image; and the developer consumption detection mechanism configured to calculate the developer consumption on the basis of the image data using the developer consumption determining method according to claim 10.

14. An apparatus comprising:

a scanning surface configured to rotate in a sub-scanning direction;

light beams configured to scan the scanning surface in a main scanning direction;

light beam spots formed on the scanning surface, partially overlapped in the main scanning direction and the sub-scanning direction, and including writing pixels; and means for dividing one of the writing pixels into a plurality of sub-pixels in the main scanning direction and a plurality of overlapping sub-pixels in the sub-scanning direction, the plurality of overlapping sub-pixels being sub-pixels on which the light beam spots overlap in the sub-scanning direction;

means for determining a weighting coefficient for each of a plurality of surrounding sub-pixels of one of the plurality of sub-pixels located within a predetermined distance from the one of the plurality of sub-pixels on the basis of respective positional relationships of the plurality of surrounding sub-pixels with the one of the plurality of sub-pixels;

means for determining respective emission coefficients for the plurality of surrounding sub-pixels on the basis of one of a plurality of durations and exposures of the light beams applied to each of the plurality of surrounding sub-pixels;

means for summing products of the weighting coefficients of the plurality of surrounding sub-pixels and the respective emission coefficients to obtain a total exposure for the one of the plurality of sub-pixels;

means for repeating for all of the plurality of sub-pixels the steps of determining the weighting coefficient determining respective emission coefficients, and summing products; and means for summing the total exposures for all the plurality of sub-pixels to determine the developer consumption.

* * * * *